Nov. 6, 1956                D. W. MEANOR ET AL                2,769,481
MACHINE FOR FORMING STRUCTURAL MATERIAL
Filed Oct. 2, 1952                                      6 Sheets-Sheet 2
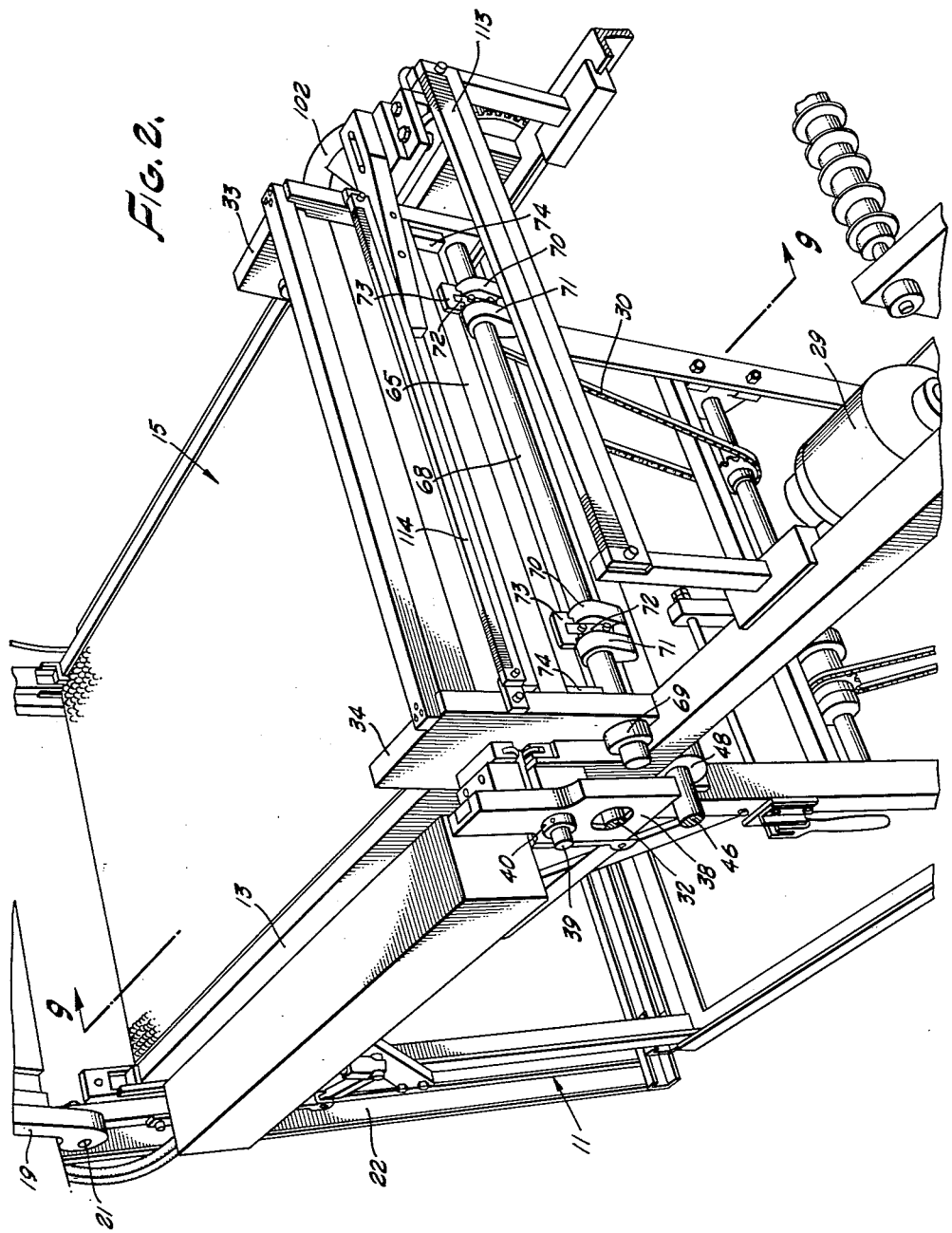
INVENTORS
DOYLE W. MEANOR
BY GLENN G. HAVENS
Lyon & Lyon
ATTORNEYS INVENTORS
DOYLE W. MEANOR
GLENN G. HAVENS
BY
Lyon & Lyon
ATTORNEYS Nov. 6, 1956 D. W. MEANOR ET AL 2,769,481
MACHINE FOR FORMING STRUCTURAL MATERIAL
Filed Oct. 2, 1952 6 Sheets-Sheet 5

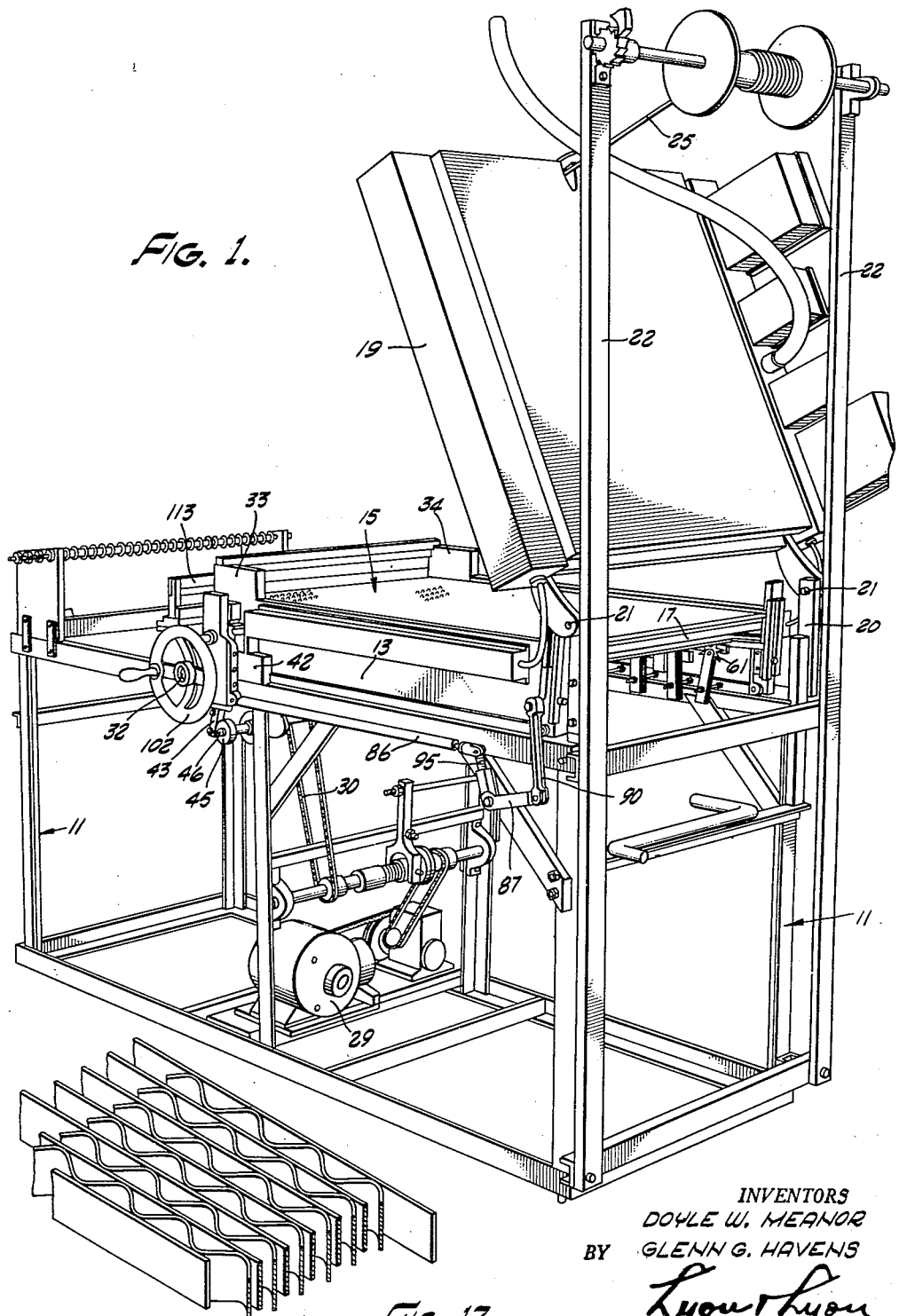

INVENTORS
DOYLE W. MEANOR
GLENN G. HAVENS
BY
Lyon & Lyon
ATTORNEYS

Nov. 6, 1956  D. W. MEANOR ET AL  2,769,481
MACHINE FOR FORMING STRUCTURAL MATERIAL
Filed Oct. 2, 1952  6 Sheets-Sheet 6
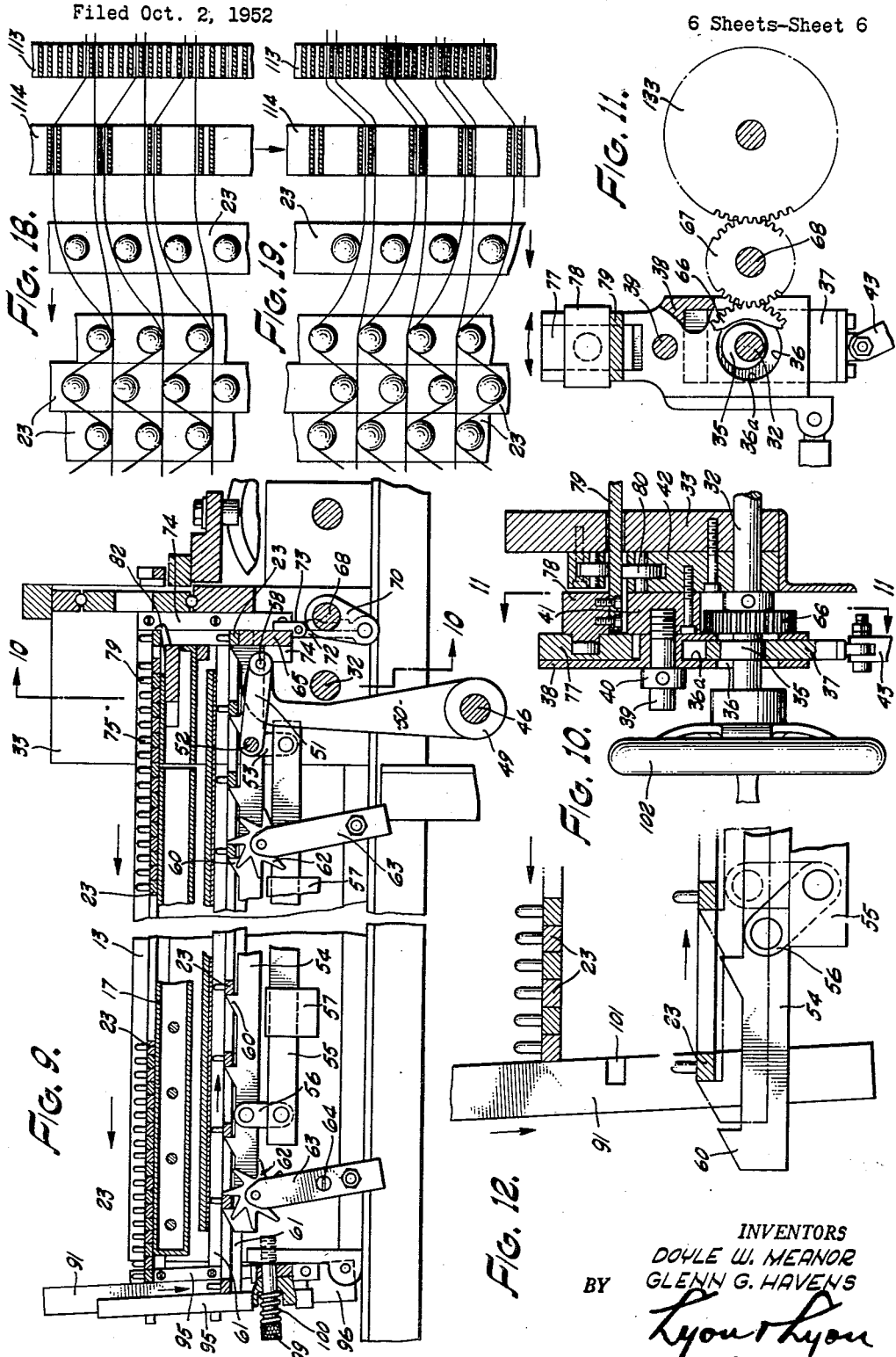
INVENTORS
DOYLE W. MEANOR
GLENN G. HAVENS
BY
Lyon & Lyon
ATTORNEYS

United States Patent Office 2,769,481
Patented Nov. 6, 1956

2,769,481

MACHINE FOR FORMING STRUCTURAL MATERIAL

Doyle W. Meanor and Glenn G. Havens, San Diego, Calif., assignors to Narmco, Inc., San Diego, Calif., a corporation of California Application October 2, 1952, Serial No. 312,830

18 Claims. (Cl. 154—1.8)

This invention relates to a machine for preparing and forming structural materials.

The present invention is directed to a machine for constructing the core of a light weight structural material consisting of a plurality of ribbons of thin material, alternate ribbons being undulated. An example of such a core material is described in a co-pending application Serial No. 154,138 of Glenn G. Havens, filed April 5, 1950, issued as Patent No. 2,644,777.

One form of machine for forming such a core material is described in a co-pending application Serial No. 226,269 of Glenn G. Havens, filed May 14, 1951, issued as United States Patent No. 2,606,133.

This invention is an improved machine for forming such a core material which in many respects resembles the machine described in U. S. Patent No. 2,606,133 to which reference is made for a description of many details as this application is concerned with the improvements to such a machine.

In order to construct a core material of this type it is necessary to form the individual ribbons and locate them in the proper relationship. It is desirable that the forming of the ribbons and securing them to one another be continuous so that a continual flow of finished core be produced by the machine.

It is, therefore, the principal object of this present invention to provide a machine for forming a core for a structural material comprising a plurality of undulating ribbons.

It is a further object of this invention to provide a machine which substantially automatically forms such a core.

It is a further object of this invention to provide a machine which may be continuously operated to produce such a core.

It is a more particular object of this invention to provide such a machine whereby straight ribbon elements may be fed to the machine where they will be automatically shaped, aligned and treated to effect a continuous formation of the desired core.

In general the invention contemplates a plurality of forming bars upon which the ribbons utilized are continuously threaded, moving said forming bars through an oven wherein the shaped ribbons are treated, forming the desired core material which is discharged at the rear of the oven, withdrawing the forming bars from the core material at the rear of the oven and delivering them again to the front of the oven.

Other objects and advantages of this invention will be readily apparent from the following description:

In the drawings:

Figure 1 is a perspective view of a machine embodying this invention taken from the right rear corner thereof.

Figure 2 is a perspective view taken from the left front corner.

Figure 9 is a section taken along line 9—9 of Figure 2.

Figure 10 is a section taken along line 10—10 of Figure 9.

Figure 11 is a diagrammatic section taken along line 11—11 of Figure 10.

Figure 12 is a diagrammatic side elevation at the rear of the machine illustrating the forming bar lowering means.

Figure 13 is a section taken along line 13—13 of Figure 3.

Figure 14 is a side elevation illustrating the forming bar retaining pawl.

Figure 15 is a section taken along line 15—15 of Figure 8.

Figure 16 is a side elevation illustrating the forming bar supporting pawl.

Figure 17 is a perspective view of the structural material core formed by the machine.

Figure 18 is a diagrammatic view of the formation of the core material.

Figure 19 is a diagrammatic view of the formation of the core material.

Figure 8:
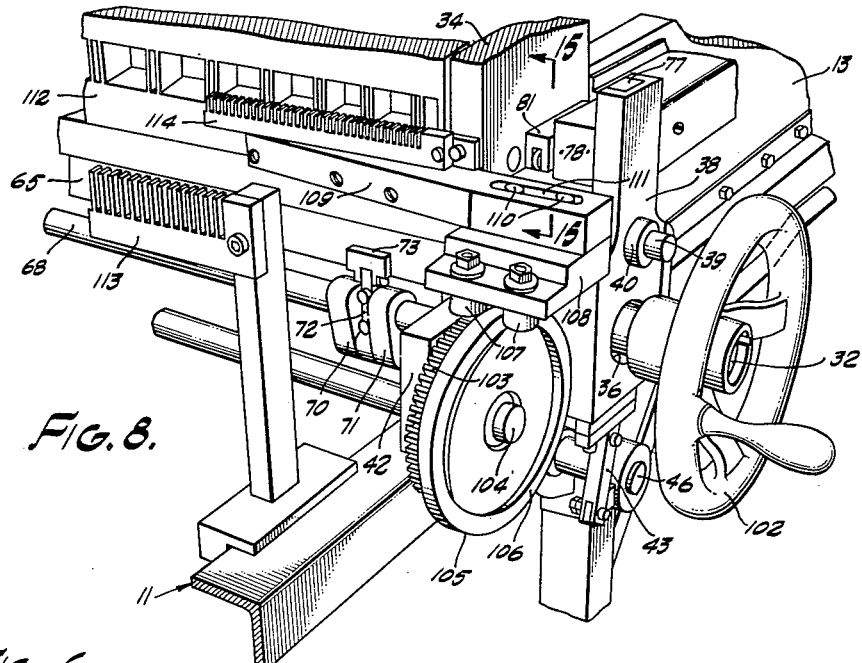
Figure 8 is a perspective view of the material forming guides and operating means.

Referring now to Figure 1 the machine is provided with a frame 11 which is generally rectangular in shape and has a side panel 13 suitably secured thereto on each side of the frame, adjacent the rear end thereof which forms the walls of an oven 15 wherein the core material is heated so that a thermal setting adhesive can be suitably heated therein to bind the ribbons of the core material together. An oven bed 17 is supported by the side panels and siutable heating elements are mounted in said oven.

An oven top 19 is pivotally mounted by pins 21 to blocks 20. The oven top has attached to its front end a cable 25 which permits pivoting of the oven top through block and tackle or similar means, to permit inspection of the oven bed 17 and the forming bars 23. Said block and tackle is mounted upon the vertically projecting frame 22, which is suitably secured to the frame 11 at the rear of the machine.

Figure 6:
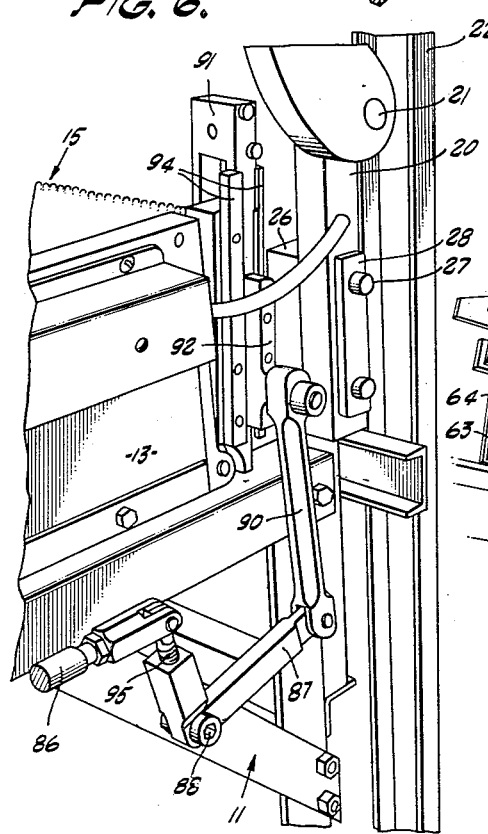
Figure 6 is a perspective view of the forming bar raising means.
Figure 7:
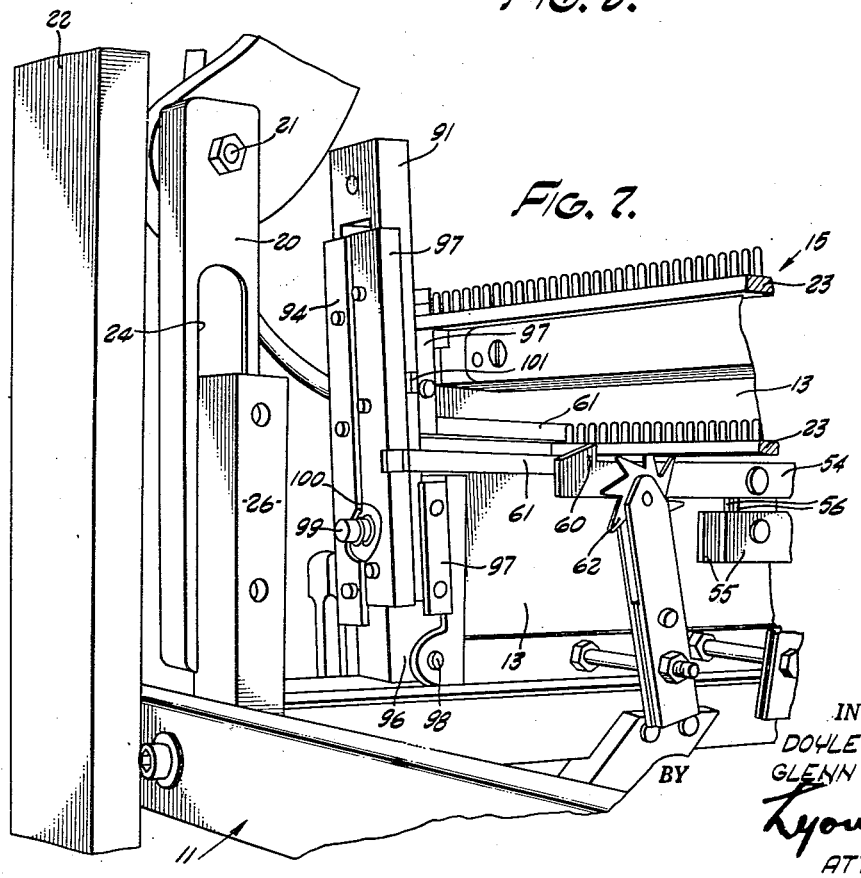
Figure 7 is a perspective view of the rear end of the machine illustrating the forming bar lowering and return means.

To permit the machine to form core material of various thicknesses the oven top 19 may be adjusted vertically, as best seen in Figures 6 and 7. In this embodiment pins 21 are mounted on blocks 20 which are vertically adjustable and provided with internal groves 24. Into each groove 24 fits a block 26 which in turn is bolted to the frame 11. Bolts 27 project through said block 20 and into a plate 28. When the bolts are tightened the block 20 is held against block 26 preventing movement of said block 20.

The oven bed 17 supports the forming bars 23 during the heating process as described in the above referred to application Serial No. 226,269, with few exceptions, which will hereinafter be described in detail. The desired undulations in the core material are formed by a transversely movable ribbon guide as hereinafter will be described while the forming bars are fixed insofar as transverse movement is concerned, said bars being delivered to the oven bed automatically.

Referring now to Figure 9, the circulation of the forming bars 23 through the machine contemplates the following steps. First the bars are moved from the rear of the machine to the front beneath the oven bed 17. Then the forming bars are raised to a level with the oven bed where the ribbons are positioned on the bars. The bars 23 are then urged slowly through the oven. One or more of the ribbons is provided with a coating of a thermal setting adhesive which sets during heating in the oven, binding the ribbons together forming the core material.

When a forming bar 23 has progressed through the oven it is withdrawn from the core material and lowered beneath the level of the oven bed 17. This progress of a forming bar 23 is continuous and automatic with the driving power for the machine provided by a suitable motor such as 29, which, through a suitable gear reduction box drives the drive chain 30.

Figure 3:
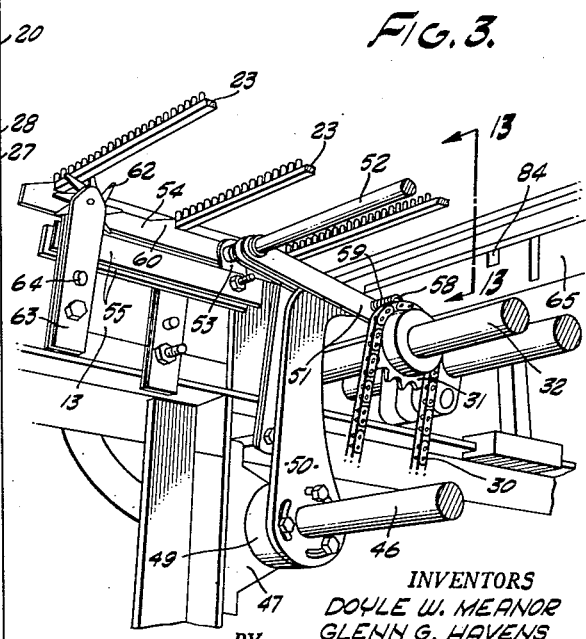
Figure 3 is a partial perspective of the front end of the machine looking upwardly into the forming bar return mechanism.
Figure 4:
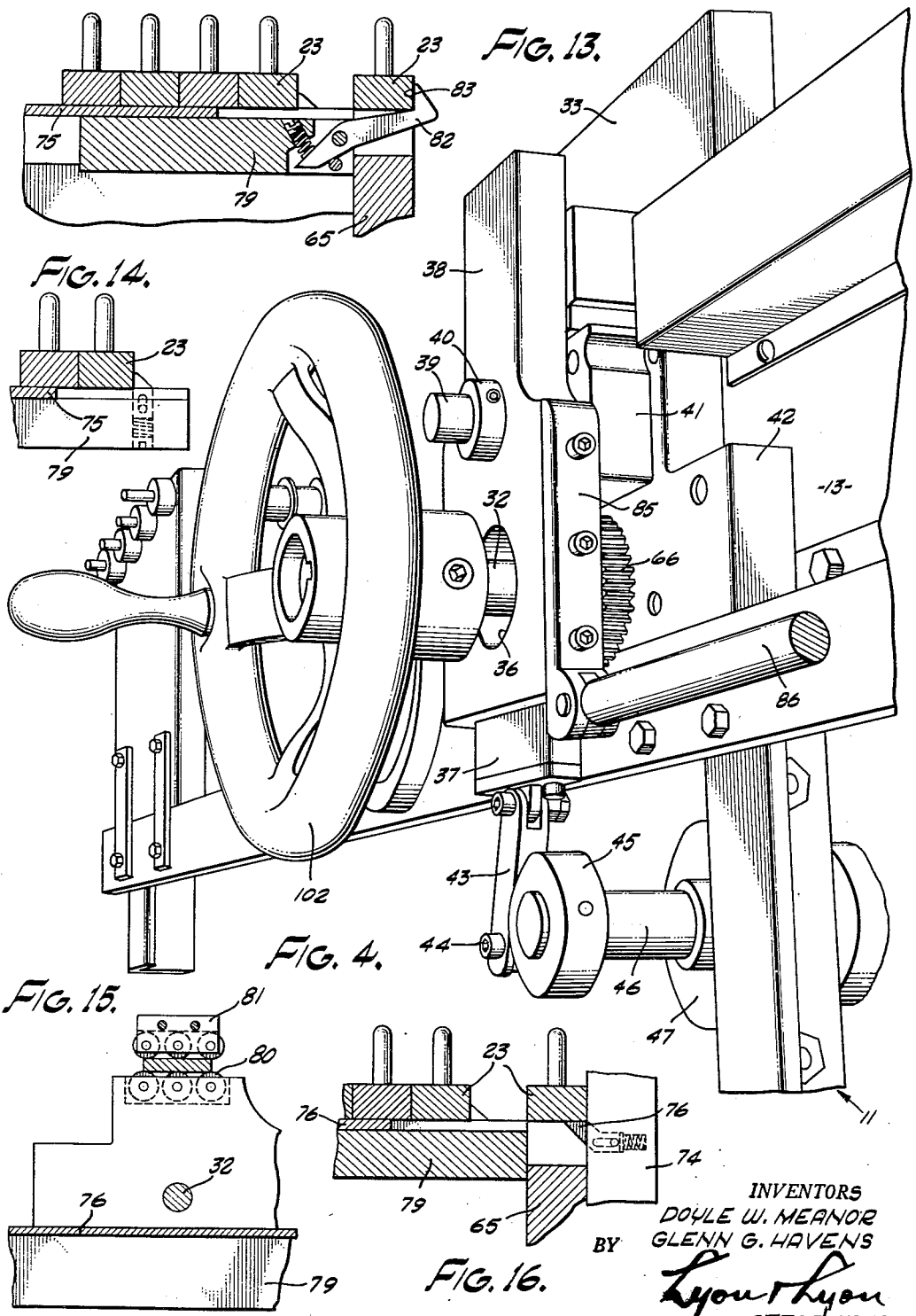
Figure 4 is an enlarged perspective view of the forming bar delivery means.

First the movement of the forming bars 23 beneath the oven bed 17 from the rear to the front of the machine and the mechanism for accomplishing this will be described (which is best seen in Figures 3 and 4). The drive chain 30 passes about a suitable sprocket 31 and rotates the main shaft 32. This shaft is supported in suitable bearings formed in the side panel extensions 33 and 34, which are secured to side panels 13 by plates 42.

Attached to each end of shaft 32 is an eccentric 35. The eccentric and associated mechanism are the same on each side of the machine, hence only that on the right front corner of the machine will be described.

The eccentric 35 fits into an aperture 36a formed in the slide 37 so that rotary motion of said shaft causes the slide 37 to move rocker 38, which is provided with an internal way adapted to receive the slide (best seen in Figures 10 and 11). The rocker 38 oscillates about shaft 39, for a purpose hereinafter to be described, which permits movement of the slide 37 in the rocker without binding. In addition, rocker 38 is provided with an aperture 36 adapted to permit such oscillation of rocker 38 without binding.

The shaft 39 is stationary and is mounted by a collar 40 upon the spacer 41, which in turn is secured to a plate 42, which in turn is secured to the side panel extension 33. Thus when shaft 32 rotates the eccentric 35 causes the rocker 38 to oscillate back and forth on shaft 39 and also moves the slide 37 in and out of the rocker.

A suitable connecting rod 43, as seen in Figure 4, is pivotally connected to the lower extremity of the slide 37 and to the crank pin 44 of collar 45 which in turn is mounted upon positioner shaft 46 so that the up and down movement of slide 37 is transmitted as rotary motion to the shaft 46. Such rotation is through a part revolution only after which a corresponding reverse rotation is produced.

The positioner shaft 46 is mounted in suitable bearing blocks 47 and 48 on either side of frame 11 and transmits its movement to the collar 49 which is rigidly secured to said shaft 46 (see Figure 3). The positioner 50 is bolted to collar 49 and is reciprocated through an arc by movement of shaft 46. This arc is adjustable by loosening the bolts securing it to collar 49 and rotating the positioner which is slotted for this purpose.

A pair of bars 51 are pivotally fastened one on each side to the forwardly curved head of the positioner 50. These bars are pivotally secured at their other extremities to the equalizer shaft 52 which extends across the machine to the corresponding bars on the other side of the machine to insure simultaneous movement of both sets of bars.

Pivotally mounted at either end of the equalizer shaft are a pair of links 53 and a rearwardly extending positioner bar 54. Pivotally connected outside of either link 53 are parallel plates 55. A second pair of links 56 (see Figure 7) suspend the rear end of plates 55 from the positioner bar 54, thereby forming a parallelogram. Guide blocks 57 (see Figure 9) are secured to side panels 13 and support the plates 55 permitting longitudinal movement thereof, but preventing vertical movement of said plates.

Said blocks 57 bear against said plates creating a drag thereon. This drag or inertia permits the positioner bar 54 to move upwardly on the forward stroke of the positioner 50 prior to forward movement of bar 54, links 53 and 56 and parallel plates 55. In this manner the bar 54 moves vertically beneath the forming bars 23 prior to forward movement. The manner in which the positioner 50 is secured to the bars 51 aids in this respect. A bolt 58 projects through all three and has a compression spring 59, as best seen in Figure 3, mounted thereon which spring forces the bars and positioner together when the nut is tightened. This added friction tends to move links 53 and hence positioner bar 54 vertically prior to horizontal movement thereof.

The linkage above described will cause the positioner bar 54 to move upwardly and then forwardly on the forward stroke of the positioner 50. As best seen in Figure 9 on the upward movement of the positioner bar 54 the fingers 60 are moved to a position contacting a forming bar 23 so that said bar 23 is moved forward upon movement of the bar 54 forward. In this manner the forming bars are continuously moved beneath the oven bed to the front of the machine.

The forming bars are supported at each end by restraining tracks 61 which are mounted in turn upon the side panels 13 during this movement from rear to front. It is desirable, to prevent coasting of the bars 23 in said tracks during movement and after fingers 60 have been lowered on the back stroke of the positioner 50, to provide drag means such as toothed wheel 62 rotatably mounted between brackets 63, which in turn are mounted on side panel 13. The toothed wheel or spur 62 is engaged by and turned by each successive forming bar 23 as it passes forward. This creates a resistance or drag, eliminating coasting of said forming bars, which resistance or drag may be varied by tightening screw 64 closing brackets 63 together and increasing frictional resistance to rotation of spur 62.

It is readily apparent that when the positioner 50 has completed its forward stroke the positioner bar 54 has similarly reached its forward position. The positioner bar 54 is then lowered and then moved rearwardly upon the rearward stroke of positioner 50. Thus the fingers 60 are disengaged from the forming bars 23 and lowered beneath the underside of the forming bars and moved to the rear of the next successive forming bar. Upon the next forward stroke of the positioner 50 the bar 54 and fingers 60 raise and engage the next forming bar to the rear and move it forward. A plurality of fingers 60 are provided on the positioner bar 54 to move a forming bar 23 progressively forward and in this manner a forming bar is moved to the front of the machine.

After the forming bar 23 has progressed to the front of the machine it is necessary to raise it to the level of the oven bed. This is accomplished by delivery of a forming bar 23 to the elevator 65 by the positioning bar 54. The elevator 65 is caused to rise by means mounted upon the right forward side of the machine. As the shaft 32 is rotated by motor 29 and chain 30 it causes rotation of a spur gear 66 which is mounted thereon between eccentric 35 and plate 42 (see Figures 4 and 10). This gear 66 meshes with a driven gear 67 (see Figures 5 and 11) which is mounted upon shaft 68 which is thus driven by said gear 66. Gears 66 and 67, in this embodiment, have the same pitch and number of teeth, driving shaft 68 at the same speed and in the opposite direction from shaft 32. The shaft 68 is rotatably supported in suitable bearings formed in side panel extensions 33 and 34 and plate 42, and suitably positioned by adjustment of collars such as 69 (see Figure 2).

Rigidly connected to shaft 68 are cranks 70 and 71 between which a connecting rod 72 is pivotally connected. The connecting rod 72 is also pivotally connected to a bracket 73 which is secured to elevator 65 so that rotation of shaft 68 causes the elevator to raise and lower (see Figures 2, 8 and 11). Several of such crank and connecting rod arrangements may be utilized to insure even movement of said elevator.

The elevator is guided during vertical movement by, and rides at each end between, parallel gibs 74 which are rigidly secured to the inner faces of side panel extensions 33 and 34 (see Figures 2 and 9).

Attached to the side panel extensions 33 and 34 is an oven bed extension 75 which extends rearwardly to the edge of the oven bed 17 and forwardly to the upper position of elevator 65 and across the width of the machine. Thus the elevator 65 raises a forming bar upwardly to the level of the oven bed extension, passing over the spring loaded catches 76 (see Figure 16), mounted between side panel extensions 33 and 34 and gibs 74. As the forming bar passes these catches they are forced inwardly out of the way. The catches then spring outwardly, after the forming bar passes, into suitable slots in the elevator 65 and support the forming bar at the level of the oven bed extension 75 when the elevator 65 is lowered. In this manner the forming bars are raised from the level of the positioner bar 54 to the level of the oven.

After this has been accomplished the forming bar is moved rearwardly into the oven. The mechanism for accomplishing this is the same on each side, hence only that on the right side will be described in detail.

As previously described the rocker 38 is rocked back and forth about shaft 39 by rotation of shaft 32. The rocker is grooved at its upper extremity to receive upper slide 77 (see Figures 10 and 11). The upper slide 77 is pivotally connected to the block 78, which block has at its lower extremity a sliding plate 79 which projects through a suitable slot in the side extension 33 and 34 and is mounted to a similar block on the other side of the machine. The slots in extensions 33 and 34 permit forward and rearward movement of the plate 79 but not vertical. Suitable roller bearings 80 are mounted in blocks 81 positioned between the side panel extension 33 and block 78 to permit movement of plate 79 back and forth beneath oven bed extension 75. Mounted upon plate 79 are a plurality of spring biased fingers 82 (see Figures 9 and 13) which move with the plate 79. The upper surface of the oven bed extension 75 is provided with suitable longitudinal slots to permit the fingers to extend upwardly. When a forming bar 23 is delivered by elevator 65 the spring biased fingers pass into suitable slots 84 in said elevator and are depressed by said forming bar. As the plate 79 moves further forward the fingers pass slightly beyond the bar 23 and snap up. The fingers are notched as at 83 to engage a forming bar 23 and pull it rearwardly on rearward movement of plate 79 which in turn is caused by oscillation of rocker 38 about shaft 39. The movement of the plate 79 rearwardly moves the forming bar 23 carried by it into contact with the other forming bars resting on the oven bed extension 75 and the oven bed 17 and further movement of the plate 79 moves the whole body of forming bars rearwardly a distance equal to the thickness of one forming bar.

Thus it is apparent that the forming bars 23 are successively advanced beneath the oven bed 17 and oven bed extension 75 by the positioner bar 54 and delivered by elevator 65 to the level of the oven bed. The bars are then carried by plate 79 rearwardly onto the oven bed extension 75, forcing the forming bars rearwardly through the oven.

The mechanism to remove the forming bars from the core material and lower them beneath the oven bed 17 is best illustrated in Figures 4, 6, 7 and 12. The structure is the same on each side of the machine and hence, only that on one side will be described. As seen in Figure 4, a plate 85 is rigidly mounted upon rocker 38 and has a link 86 pivotally mounted thereon. As the rocker oscillates about shaft 39, the link 86 is moved back and forth. This movement of link 86 is transmitted to an elbow 87 (see Figure 6), which is pivotally mounted about pin 88 secured to frame 11. The movement of elbow 87 is transmitted to a second link 90 pivotally secured to one arm of said elbow. This mechanism converts the horizontal reciprocating movement of link 86 into vertical reciprocating movement of ejector slide 91 which is secured to link 90. This connection is formed by pivotally connecting link 90 to a slide plate 92 which is secured to ejector slide 91. Vertical parallel guides 94 provide a guiding track in which the ejector slide 91 moves. In this manner the oscillating of rocker 38 about shaft 39 is converted to vertical reciprocation of ejector slide 91.

The link 86 has a threaded turnbuckle connection with elbow 87, as seen in Figure 6, to permit adjustment of the ejector slide's 91 position in the guides 94. In addition, one arm of elbow 87 has a threaded adjusting member 95 therein, permitting adjustment of the length of this arm and consequently the length of stroke of the ejector slide 91.

The guides 94 are mounted upon a block 96 (see Figure 7) and a corresponding pair of guides 97 are similarly mounted providing a guide at each corner of the ejector slide 91. The block 96 is pivotally mounted about pin 98 on side panel extension 13. A bolt 99 (see Figures 7 and 9) screws into side panel extension 13 and through a suitable slot in block 96 and has a spring 100 carried thereon, which bears against slide 91 and biases it towards side panel extension 13.

The ejector slide 91 is provided with a slot 101 which at the upper position of the slide is at the level of the oven bed 17. As a forming bar 23 is delivered to the oven bed extension 75, as previously described, it moves all the forming bars rearwardly through the oven the thickness of one forming bar. Thus one forming bar 23, is forced off oven bed 17 into the slot 101 which is of the proper shape to receive it. The spring biasing of the slide 91 previously described, permits a reasonable tolerance in the delivery of the forming bar 23 to slot 101 to allow for unequal expansion in the oven and other inequalities. As the ejector slide 91 is lowered it withdraws the forming bar from the core material and lowers it to the level of the guides for those forming bars being advanced by the positioner bar 54.

The guides 97 are slotted to provide clearance for the tracks 61 upon which the forming bars are supported at this level and also slotted to provide clearance for similar tracks upon which the forming bars 23 are supported while in the oven.

As the forming bar is lowered by ejector slide 91 it rests upon the tracks 61 at the lowest position of slide 91. At this time the positioner bar 54 has completed its back stroke and rises. The rear finger 60 of the positioner bar moves upwardly behind the forming bar in slot 101 and removes it from the slot and slide 91, carrying it forward toward elevator 65.

In this manner the forming bars are continuously circulating through the machine. All of the mechanisms are driven from a single source, such as motor 29 and hence are driven in timed relation with respect to each other. A hand wheel 102 may be mounted upon shaft 32 to permit manual driving of the machine for adjustments and the like.

Having described the functioning of the machine, the preferred embodiment for feeding the ribbon to the machine is as follows. The following mechanism is only on the right side of the machine.

Figure 5:
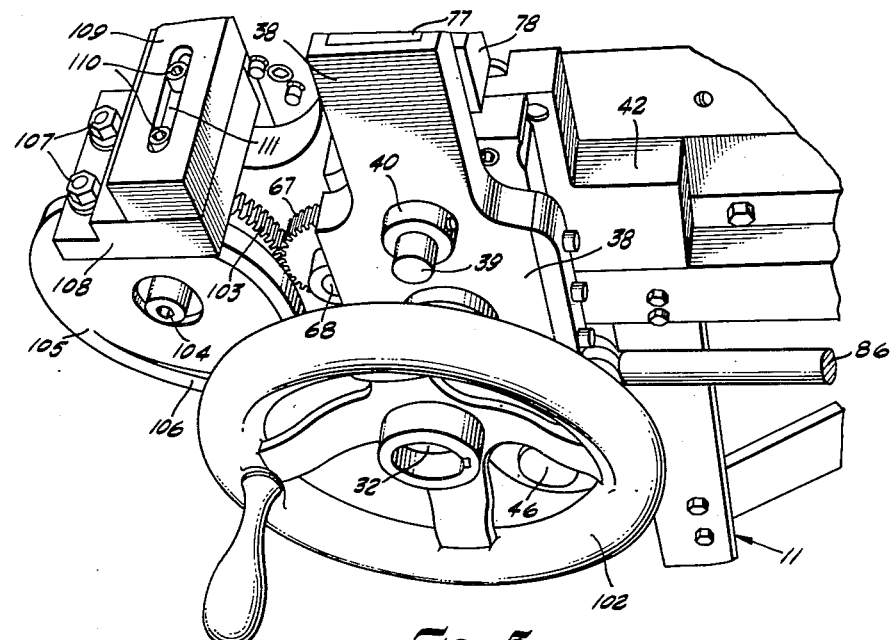
Figure 5 is a perspective view of the forming bar reciprocating means.

A gear 103, best seen in Figures 5 and 8, is rotatably mounted upon a shaft 104 which is rigidly mounted through plate 42. The gear 103 meshes with crankshaft gear 67 which rotates in the opposite direction and at twice the rate of rotation of gear 103.

Rigidly secured to gear 103 and also rotatably mounted upon shaft 104 is a cam 105. The cam has formed thereon on either side a cam track 106 which alternately engages one or the other cam followers 107 which are rigidly and adjustably secured to connecting plate 108. As the cam is rotated the outside cam follower is moved to the right in Figure 8 and then as the cam further rotates the inner cam follower is moved to the left in Figure 8, thereby imparting a reciprocating movement in a horizontal plane to the plate 108. The plate 108 is secured to a bar 109 by means of bolts 110 which project through a suitable slot 111 formed in said bar. The bar in turn is rigidly secured to the shifting feeder 112 which is thereby reciprocated by rotation of cam 105. The transverse horizontal position of shifting feeder 112 is varied by loosening the nuts and bolts 110 and adjusting the position of bar 109 with respect to plate 108. In addition, the length of reciprocation of said feeder 112 can be varied by adjusting the position of cam followers 107 inwardly or outwardly with respect to cam track 106.

Suitable ribbon guides 113 and 114 are mounted upon the machine in advance of the shifting feeder 112. The ribbons are trained through the teeth of the stationary guides 113 and 114 and to the shifting feeder 112. The teeth on the shifting feeder are formed as illustrated in Figures 18 and 19 with a pair close together then a large gap then another pair with alternate ribbons trained through a large then a small gap. In this manner the undulations are formed in the ribbons trained through the small gaps with the ribbons trained through the large gaps remaining straight as more fully set forth in the co-pending application Serial No. 226,269 of Glenn G. Havens, filed May 14, 1951.

As seen in the drawings the oven bed extension 75 and side panel extensions 33 and 34 and the elements mounted thereon are separated from the oven bed 17 and vertical side panels 13 to reduce heat conduction and transfer to these parts and to the shifting feeder 112. If the shifting feeder 112 becomes overheated it has an adverse effect on the thermal setting adhesive and tends to gum up the function of the shifting mechanism. To further reduce heat transfer, the plates 42 connecting side panels 33 and 34 to side panels 13 may be hollowed out at the surface bearing against panels 13. Pins may connect the oven bed 17 and oven bed extension 75 to provide a bridge for movement of said forming bars 23 to the oven.

Thus it can be seen that the motor 29 through chain 30 drives the conveying means to move the forming bars 23 beneath the oven 17 and oven bed extension 75 up elevator 65 and over oven bed extension 75 and oven bed 17 to the rear of the machine and then to lower them again. The movement of the forming bars draws the ribbons through the guides and into the oven. The movement of the chain 30 is converted into reciprocating movement of the shifting feeder 112 forming the desired undulations in the core material.

While what hereinbefore has been described is the preferred embodiment of this invention it is readily apparent that alterations and modifications can be resorted to without departing from the scope of this invention and are intended to be included within the scope of the appended claims.

I claim:

1. A machine for forming a structural material of a plurality of ribbons of thin material with alternate ribbons being undulated, comprising: an oven bed having an inlet and outlet end, a plurality of forming bars having a plurality of pins thereon for projecting into said structural material adapted to rest upon and be moved along said oven bed, a driven shaft, guide rails beneath said oven bed adapted to support forming bars, a forming bar engaging member, a parallelogram the upper side of which supports said forming bar engaging member beneath said guide rails, motion transmitting means transmitting rotary movement of said driven shaft into longitudinal oscillatory movement of the upper side of said parallelogram, thereby raising said forming bar engaging member into engagement with forming bars supported by said guide rails then advancing said forming bars along said guide rails, elevating means adjacent the inlet end of said oven bed receiving forming bars from said forming bar advancing means and raising same to the level of said oven bed, forming bar moving means driven by said drive means receiving forming bars from said elevating means and moving same across said oven bed, and forming bar lowering means withdrawing said pins from said structural material actuated by said drive means adjacent the output end of said oven receiving forming bars from said oven bed and lowering same to said forming bar advancing means.

2. A machine for forming a structural material of a plurality of ribbons of thin material with alternate ribbons being undulated, comprising: an oven bed having an inlet and outlet end, a plurality of forming bars having a plurality of pins thereon for projecting into said structural material adapted to rest upon and be moved along said oven bed, a driven shaft, guide rails beneath said oven bed adapted to support forming bars, a forming bar engaging member, a parallelogram, the upper side of which supports said forming bar engaging means beneath said guide rails, friction means creating a drag on the lower side of said parallelogram, motion transmitting means transmitting rotary movement of said driven shaft into longitudinal movement of the upper side of said parallelogram, thereby raising said forming bar engaging member into engagement with forming bars supported by said guide rails then advancing said bars along said guide rails, elevating means adjacent the inlet end of said oven bed receiving forming bars from said forming bar advancing means and raising same to the level of said oven bed, forming bar moving means driven by said drive means receiving forming bars from said elevating means and moving same across said oven bed and forming bar lowering means withdrawing said pins from said structural material actuated by said drive means adjacent the output end of said oven receiving forming bars from said oven bed and lowering same to said forming bar advancing means.

3. A machine for forming a structural material of a plurality of ribbons of thin material with alternate ribbons being undulated, comprising: an oven bed having an inlet and outlet end, a plurality of forming bars having a plurality of pins thereon for projecting into said structural material adapted to rest upon and be moved along said oven bed, drive means, guide rails beneath said oven bed adapted to support forming bars, means driven by said drive means for advancing forming bars on said guide rails toward the inlet end of said oven bed, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, forming bar moving means driven by said drive means receiving forming bars from said elevator and moving same across said oven bed, and forming bar lowering means withdrawing said pins from said structural material actuated by said drive means adjacent the output end of said oven receiving forming bars from said oven bed and lowering same to said forming bar advancing means.

4. A machine for forming a structural material of a plurality of ribbons of thin material with alternate ribbons being undulated, comprising: an oven bed having an inlet and outlet end, a plurality of forming bars having a plurality of pins thereon for projecting into said structural material adapted to rest upon and be moved along said oven bed, drive means, guide rails beneath said oven bed adapted to support forming bars, means driven by said drive means for advancing forming bars on said guide rails toward the inlet end of said oven bed, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, spring biased forming bar engaging means adjacent the upper position of said elevator, means oscillating said engaging means toward and away from said oven bed inlet driven by said drive means, said spring biased forming bar engaging means passing beneath a forming bar held by said elevator at the level of the oven bed engaging said forming bar and moving same onto said oven bed, and forming bar lowering means withdrawing said pins from said structural material actuated by said drive means adjacent the output end of said oven receiving forming bars from said oven bed and lowering same to said forming bar advancing means.

5. A machine for forming a structural material of a plurality of ribbons of thin material with alternate ribbons being undulated, comprising: an oven bed having an inlet and outlet end, a plurality of forming bars having a plurality of pins thereon for projecting into said structural material adapted to rest upon and be moved along said oven bed, a driven shaft, guide rails beneath said oven bed adapted to support forming bars, forming bar engaging means mounted beneath said guide rails, motion transmitting means connecting said driven shaft to said forming bar engaging means driving said engaging means to engage forming bars on said guide rails and advance same towards the inlet end of said oven bed, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, forming bar moving means driven by said drive means receiving forming bars from said elevator and moving same across said oven bed, and forming bar lowering means withdrawing said pins from said structural material actuated by said drive means adjacent the output end of said oven receiving forming bars from said oven bed and lowering same to said forming bar advancing means.

6. A machine for forming a structural material of a plurality of ribbons of thin material with alternate ribbons being undulated, comprising: an oven bed having an inlet and outlet end, a plurality of forming bars having a plurality of pins thereon for projecting into said structural material adapted to rest upon and be moved along said oven bed, a driven shaft, guide rails beneath said oven bed adapted to support forming bars, forming bar engaging means mounted beneath said guide rails, motion transmitting means connecting said driven shaft to said forming bar engaging means driving said engaging means to engage forming bars on said guide rails and advance same towards the inlet end of said oven bed, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, spring biased forming bar engaging means adjacent the upper position of said elevator, means oscillating said engaging means toward and away from said oven bed inlet driven by said drive means, said spring biased forming bar engaging means passing beneath a forming bar held by said elevator at the level of the oven bed engaging said forming bar and moving same onto said oven bed, and forming bar lowering means withdrawing said pins from said structural material actuated by said drive means adjacent the output end of said oven receiving forming bars from said oven bed and lowering same to said forming bar advancing means.

7. A machine for forming a structural material of a plurality of ribbons of thin material with alternate ribbons being undulated, comprising: an oven bed having an inlet and outlet end, a plurality of forming bars having a plurality of pins thereon for projecting into said structural material adapted to rest upon and be moved along said oven bed, a driven shaft, guide rails beneath said oven bed adapted to support forming bars, a forming bar engaging member, a parallelogram the upper side of which supports said forming bar engaging member beneath said guide rails, motion transmitting means transmitting rotary movement of said driven shaft into longitudinal oscillatory movement of the upper side of said parallelogram, thereby raising said forming bar engaging member into engagement with forming bars supported by said guide rails then advancing said forming bars along said guide rails, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, forming bar moving means driven by said drive means receiving forming bars from said elevator and moving same across said oven bed, and forming bar lowering means withdrawing said pins from said structural material actuated by said drive means adjacent the output end of said oven receiving forming bars from said oven bed and lowering same to said forming bar advancing means.

8. A machine for forming a structural material of a plurality of ribbons of thin material with alternate ribbons being undulated, comprising: an oven bed having an inlet and outlet end, a plurality of forming bars having a plurality of pins thereon for projecting into said structural material adapted to rest upon and be moved along said oven bed, a driven shaft, guide rails beneath said oven bed adapted to support forming bars, a forming bar engaging member, a parallelogram the upper side of which supports said forming bar engaging member beneath said guide rails, motion transmitting means transmitting rotary movement of said driven shaft into longitudinal oscillatory movement of the upper side of said parallelogram thereby raising said forming bar engaging member into engagement with forming bars supported by said guide rails then advancing said forming bars along said guide rails, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, spring biased forming bar engaging means adjacent the upper position of said elevator, means oscillating said engaging means toward and away from said oven bed inlet driven by said drive means, said spring biased forming bar engaging means passing beneath a forming bar held by said elevator at the level of the oven bed engaging said forming bar and moving same onto said oven bed, and forming bar lowering means withdrawing said pins from said structural material actuated by said drive means adjacent the output end of said oven receiving forming bars from said oven bed and lowering same to said forming bar advancing means.

9. In a machine of the class described the combination of: an oven bed having an inlet and outlet end, a plurality of forming bars adapted to rest upon and be moved along said oven bed, drive means, guide rails beneath said oven bed adapted to support forming bars, means driven by said drive means for advancing forming bars on said guide rails toward the inlet end of said oven bed, elevating means adjacent the inlet end of said oven bed receiving forming bars from said forming bar advancing means and raising same to the level of said oven bed, forming bar moving means driven by said drive means receiving forming bars from said elevating means and moving same across said oven bed, a slide movably mounted at the discharge outlet of said oven bed having a slot therein to receive a forming bar discharged from said oven bed, and means translating rotary movement of said slide to vertical reciprocating movement of said slide thereby receiving a forming bar from said oven bed and lowering same to to the level of said forming bar advancing means.

10. In a machine of the class described the combination of: an oven bed having an inlet and outlet end, a plurality of forming bars adapted to rest upon and be moved along said oven bed, drive means, guide rails beneath said oven bed adapted to support forming bars, means driven by said drive means for advancing forming bars on said guide rails toward the inlet end of said oven bed, elevating means adjacent the inlet end of said oven bed receiving forming bars from said forming bar advancing means and raising same to the level of said oven bed, forming bar moving means driven by said drive means receiving forming bars from said elevating means and moving same across said oven bed, a slide movably mounted at the discharge outlet of said oven bed having a slot therein to receive a forming bar discharged from said oven bed, the mounting for said slide being resiliently attached to said oven bed to permit movement of said slide with respect to said oven bed, and means translating rotary movement of said slide to vertical reciprocating movement of said slide thereby receiving a forming bar from said oven bed and lowering same to the level of said forming bar advancing means.

11. In a machine of the class described the combination of: an oven bed having an inlet and outlet end, a plurality of forming bars adapted to rest upon and be moved along said oven bed, a driven shaft, guide rails beneath said oven bed adapted to support forming bars, forming bar engaging means mounted beneath said guide rails, motion transmitting means connecting said driven shaft to said forming bar engaging means driving said engaging means to engage forming bars on said guide rails and advance same towards the inlet end of said oven bed, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, forming bar moving means driven by said drive means receiving forming bars from said elevator and moving same across said oven bed, a slide movably mounted at the discharge outlet of said oven bed having a slot therein to receive a forming bar discharged from said oven bed, and means translating rotary movement of said slide to vertical reciprocating movement of said slide thereby receiving a forming bar from said oven bed and lowering same to the level of said guide rails.

12. In a machine of the class described the combination of: an oven bed having an inlet and outlet end, a plurality of forming bars adapted to rest upon and be moved along said oven bed, a driven shaft, guide rails beneath said oven bed adapted to support forming bars, forming bar engaging means mounted beneath said guide rails, motion transmitting means connecting said driven shaft to said forming bar engaging means driving said engaging means to engage forming bars on said guide rails and advance same towards the inlet end of said oven bed, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, forming bar moving means driven by said drive means receiving forming bars from said elevator and moving same across said oven bed, a slide movably mounted at the discharge outlet of said oven bed having a slot therein to receive a forming bar discharged from said oven bed, the mounting for said slide being resiliently attached to said oven bed to permit movement of said slide with respect to said oven bed, and means translating rotary movement of said slide to vertical reciprocating movement of said slide thereby receiving a forming bar from said oven bed and lowering same to the level of said guide rails.

13. In a machine of the class described the combination of: an oven bed having an inlet and outlet end, a plurality of forming bars adapted to rest upon and be moved along said oven bed, a driven shaft, guide rails beneath said oven bed adapted to support forming bars, forming bar engaging means mounted beneath said guide rails, motion transmitting means connecting said driven shaft to said forming bar engaging means driving said engaging means to engage forming bars on said guide rails and advance same towards the inlet end of said oven bed, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, spring biased forming bar engaging means adjacent the upper position of said elevator, means oscillating said engaging means toward and away from said oven bed inlet driven by said drive means, said spring biased forming bar engaging means passing beneath a forming bar held by said elevator at the level of the oven bed engaging said forming bar and moving same onto said oven bed, a slide movably mounted at the discharge outlet of said oven bed having a slot therein to receive a forming bar discharged from said oven bed, and means translating rotary movement of said slide to vertical reciprocating movement of said slide thereby receiving a forming bar from said oven bed and lowering same to the level of said guide rails.

14. In a machine of the class described the combination of: an oven bed having an inlet and outlet end, a plurality of forming bars adapted to rest upon and be moved along said oven bed, a driven shaft, guide rails beneath said oven bed adapted to support forming bars, forming bar engaging means mounted beneath said guide rails, motion transmitting means connecting said driven shaft to said forming bar engaging means driving said engaging means to engage forming bars on said guide rails and advance same towards the inlet end of said oven bed, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, spring biased forming bar engaging means adjacent the upper position of said elevator, means oscillating said engaging means toward and away from said oven bed inlet driven by said drive means, said spring biased forming bar engaging means passing beneath a forming bar held by said elevator at the level of the oven bed engaging said forming bar and moving same onto said oven bed, a slide movably mounted at the discharge outlet of said oven bed having a slot therein to receive a forming bar discharged from said oven bed, the mounting for said slide being resiliently attached to said oven bed to permit movement of said slide with respect to said oven bed, and means translating rotary movement of said slide to vertical reciprocating movement of said slide thereby receiving a forming bar from said oven bed and lowering same to the level of said guide rails.

15. In a machine of the class described the combination of: an oven bed having an inlet and outlet end, a plurality of forming bars adapted to rest upon and be moved along said oven bed, a driven shaft, guide rails beneath said oven bed adapted to support forming bars, a forming bar engaging member, a parallelogram the upper side of which supports said forming bar engaging member beneath said guide rails, motion transmitting means transmitting rotary movment of said driven shaft into longitudinal oscillatory movement of the upper side of said parallelogram thereby raising said forming bar engaging member into engagement with forming bars supported by said guide rails then advancing said forming bars along said guide rails, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, forming bar moving means driven by said drive means receiving forming bars from said elevator and moving same across said oven bed, a slide movably mounted at the discharge outlet of said oven bed having a slot therein to receive a forming bar discharged from said oven bed, and means translating rotary movement of said slide to vertical reciprocating movement of said slide thereby receiving a forming bar from said oven bed and lowering same to the level of said guide rails.

16. In a machine of the class described the combination of: an oven bed having an inlet and outlet end, a plurality of forming bars adapted to rest upon and be moved along said oven bed, a driven shaft, guide rails beneath said oven bed adapted to support forming bars, a forming bar engaging member, a parallelogram the upper side of which supports said forming bar engaging member beneath said guide rails, motion transmitting means transmitting rotary movement of said driven shaft into longitudinal oscillatory movement of the upper side of said parallelogram thereby raising said forming bar engaging member into engagement with forming bars supported by said guide rails then advancing said forming bars along said guide rails, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, forming bar moving means driven by said drive means receiving forming bars from said elevator and moving same across said oven bed, a slide movably mounted at the discharge outlet of said oven bed having a slot therein to receive a forming bar discharged from said oven bed, the mounting for said slide being resiliently attached to said oven bed to permit movement of said slide with respect to said oven bed, and means translating rotary movement of said slide to vertical reciprocating movement of said slide thereby receiving a forming bar from said oven bed and lowering same to the level of said guide rails.

17. In a machine of the class described the combination of: an oven bed having an inlet and outlet end, a plurality of forming bars adapted to rest upon and be moved along said oven bed, a driven shaft, guide rails beneath said oven bed adapted to support forming bars, a forming bar engaging member, a parallelogram the upper side of which supports said forming bar engaging member beneath said guide rails, motion transmitting means transmitting rotary movement of said driven shaft into longitudinal oscillatory movement of the upper side of said parallelogram thereby raising said forming bar engaging member into engagement with forming bars supported by said guide rails then advancing said forming bars along said guide rails, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, spring biased forming bar engaging means adjacent the upper position of said elevator, means oscillating said engaging means toward and away from said oven bed inlet driven by said drive means, said spring biased forming bar engaging means passing beneath a forming bar held by said elevator at the level of the oven bed engaging said forming bar and moving same onto said oven bed, a slide movably mounted at the discharge outlet of said oven bed having a slot therein to receive a forming bar discharged from said oven bed, and means translating rotary movement of said slide to vertical reciprocating movement of said slide thereby receiving a forming bar from said oven bed and lowering same to the level of said guide rails.

18. In a machine of the class described the combination of: an oven bed having an inlet and outlet end, a plurality of forming bars adapted to rest upon and be moved along said oven bed, a driven shaft, guide rails beneath said oven bed adapted to support forming bars, a forming bar engaging member, a parallelogram the upper side of which supports said forming bar engaging member beneath said guide rails, motion transmitting means transmitting rotary movement of said driven shaft into longitudinal oscillatory movement of the upper side of said parallelogram thereby raising said forming bar engaging member into engagement with forming bars supported by said guide rails then advancing said forming bars along said guide rails, an elevating shaft driven by said driven means, an elevator, crank means attaching said elevator to said elevator shaft so that rotation of said elevating shaft raises said elevator from a position where forming bars are delivered to said elevator by said forming bar advancing means to a position level with said oven bed, spring biased forming bar engaging means adjacent the upper position of said elevator, means oscillating said engaging means toward and away from said oven bed inlet driven by said drive means, said spring biased forming bar engaging means passing beneath a forming bar held by said elevator at the level of the oven bed engaging said forming bar and moving same onto said oven bed, a slide movably mounted at the discharge outlet of said oven bed having a slot therein to receive a forming bar discharged from said oven bed, the mounting for said slide being resiliently attached to said oven bed to permit movement of said slide with respect to said oven bed, and means translating rotary movement of said slide to vertical reciprocating movement of said slide thereby receiving a forming bar from said oven bed and lowering same to the level of said guide rails.

References Cited in the file of this patent

UNITED STATES PATENTS

| | | |
|---|---|---|
| 2,406,051 | Weiss | Aug. 20, 1946 |
| 2,494,642 | Case et al. | Jan. 17, 1950 |
| 2,513,777 | Andre | July 4, 1950 |
| 2,556,011 | Swayze et al. | June 5, 1951 |
| 2,606,133 | Havens | Aug. 5, 1952 |
| 2,609,314 | Engel et al. | Sept. 2, 1952 |